United States Patent
O'Brien

[11] 3,923,662
[45] Dec. 2, 1975

[54] FILTER CARTRIDGE FOR WATER COOLERS

[75] Inventor: Raymond A. O'Brien, Forest Park, Ill.

[73] Assignee: Cleveland Hardware and Forging Company, Chicago, Ill.

[22] Filed: Mar. 11, 1974

[21] Appl. No.: 449,976

[52] U.S. Cl. .................. 210/251; 62/319; 210/175; 210/493
[51] Int. Cl.² ......................................... B01D 27/06
[58] Field of Search .......... 210/153, 181, 186, 175, 210/251, 437, 493 ; 62/317, 318, 319

[56] References Cited
UNITED STATES PATENTS

| | | | |
|---|---|---|---|
| 605,500 | 6/1898 | Morrison | 62/318 |
| 648,904 | 5/1900 | Hart | 62/319 |
| 1,078,214 | 11/1913 | Patnaude | 62/317 X |
| 1,547,855 | 7/1925 | Burson | 62/318 X |
| 1,551,572 | 9/1925 | Kneuper | 62/319 |
| 3,481,473 | 12/1969 | Howard | 210/335 X |
| 3,481,476 | 12/1969 | Taylor | 210/335 |
| 3,720,323 | 3/1973 | Landree | 210/493 |
| 3,752,321 | 8/1973 | McLaren | 210/493 |

*Primary Examiner*—Theodore A. Granger
*Attorney, Agent, or Firm*—Lockwood, Dewey, Zickert & Alex

[57] ABSTRACT

A disposable water filter cartridge and support assembly for insertion in a sump of a refrigerated water cooler. The filter includes a filtering element having an elongate surface folded in accordian pleats with the ends fastened together defining a generally annular structure with a hollow core. Top and bottom covers form a water-tight seal with the filtering media edges they enclose. Each cover has a substantially flat outside surface. The top cover has a centrally located aperture permitting fluid flow into the hollow core and a flexible lip at the outer circumference of the cover forms a seal between the filter and the water cooler sump wall. The filter cartridge is located in an elevated position in the sump resting on a support structure.

3 Claims, 5 Drawing Figures

FILTER CARTRIDGE FOR WATER COOLERS

This invention relates to disposable water filter cartridges and assemblies for insertion in the refrigerated sumps or wells of water coolers to remove particulate matter from water withdrawn from the cooler.

Heretofore, filters have not generally been used in water coolers of the type having an inverted water supply bottle, a refrigerated water receiving sump, and a gravity feed outlet. The bottled water used in refrigerated water coolers is normally potable and fit for drinking without filtering or treatment. Generally water coolers have a circular shroud located above the sump for engaging the neck of the inverted water bottle so as to support the bottle. The shroud also serves to keep larger particulate matter from entering the sump as long as the bottle is in place.

However, water coolers are commonly used in locations varying in environmental quality. Water coolers placed in particularly dirty or dusty locations and subject to sustained periods of time between bottle removal and replacement are susceptible to contamination from particulate matter entering the sump. For instance, dust settling on top of a water bottle or the cooler top surface may fall into the sump as a bottle is removed from its installed position. A sump left open for a period of time in a dirty environment may be the recipient of matter ranging from specks and flakes of particles to nuts, bolts and cigarette butts. Applicant's invention removes contamination picked up by water flowing through the sump by forming a combined filter and seal across the sump well whereby all fluid emerging from the cooler must pass through the filter media.

The disposable water filter cartridge assembly of the present invention includes a filtering element, a bottom cover, and a top cover with a flexible circumferential lip seal, suitable united to provide an effective sealing and filtering cartridge assembly which can be conveniently installed, removed, and replaced with minimum effort. The filtering element is a long sheet of porous filter material folded at regular intervals into accordian pleats with the two end intervals fastened together defining a generally cylindrical annular structure having a hollow circular core. The top and bottom covers engage and seal the respective edges of the filtering element. The top cover has a center aperture to accommodate the mouth on an inverted water bottle or demijohn and provide access to the hollow central core. The cover has a pliable rubber-like protruding circumferential lip for engaging the inner side wall of the sump to form a continuous seal which prevents liquid and foreign particulate material bypassing the filter element. The bottom cover completely encloses the bottom of the filter and has a circumference corresponding to that of the filter element.

The readily replaceable and disposable water filter cartridge assembly, as inserted in the water cooler refrigerating sump, is preferably maintained in a spaced relation or elevated position with respect to the sump bottom. A splash shield, commonly used in water cooler sumps may be readily modified by shortening its legs to form a support for the filter cartridge of the present invention. Contact pressure at the top cover lip seal may be sufficient to hold the cartridge in spaced relation to the sump bottom. However, the efficiency of the seal is diminished if the cartridge is oriented to the liner at other than a horizontal position. The support maintains the cartridge in both a horizontal position and a fixed spaced relation to the sump bottom. The support is a generally circular disk having truncated opposing edges formed by parallel cords defining two truncated sides. Legs are attached to the disk to support it horizontally at the desired distance from the sump bottom. When the support is formed from a splash shield leg supports are shortened sufficiently to allow the filter cartridge assembly to be recessed a proper amount into the sump to receive efficient fluid flow therethrough.

The object of the invention generally stated is to provide a simple, inexpensive, efficient, and disposable filter for use in a refrigerated water cooler.

An important object of the invention is the provision of a replaceable filter and sealing barrier positioned across a water cooler cump well to remove particulate matter from water flowing theough the sump.

A further object of the invention is to support a disposable filter cartridge in spaced relation with a water cooler sump bottom surface providing a supply of filtered water in the lower portion of the sump for ready removal and consumption.

Another object of the invention is the provision of a disposable filter cartridge supported horizontally in a water cooler sump to maintain an effective seal between a resilient marginal lip on the cartridge and a liner portion of the sump.

Other objects, features, and advantages of the invention will be apparent from the following detailed disclosure, taken in conjunction with the accompanying sheets of drawings, wherein like reference numerals refer to like parts, and in which.

Figure 1:
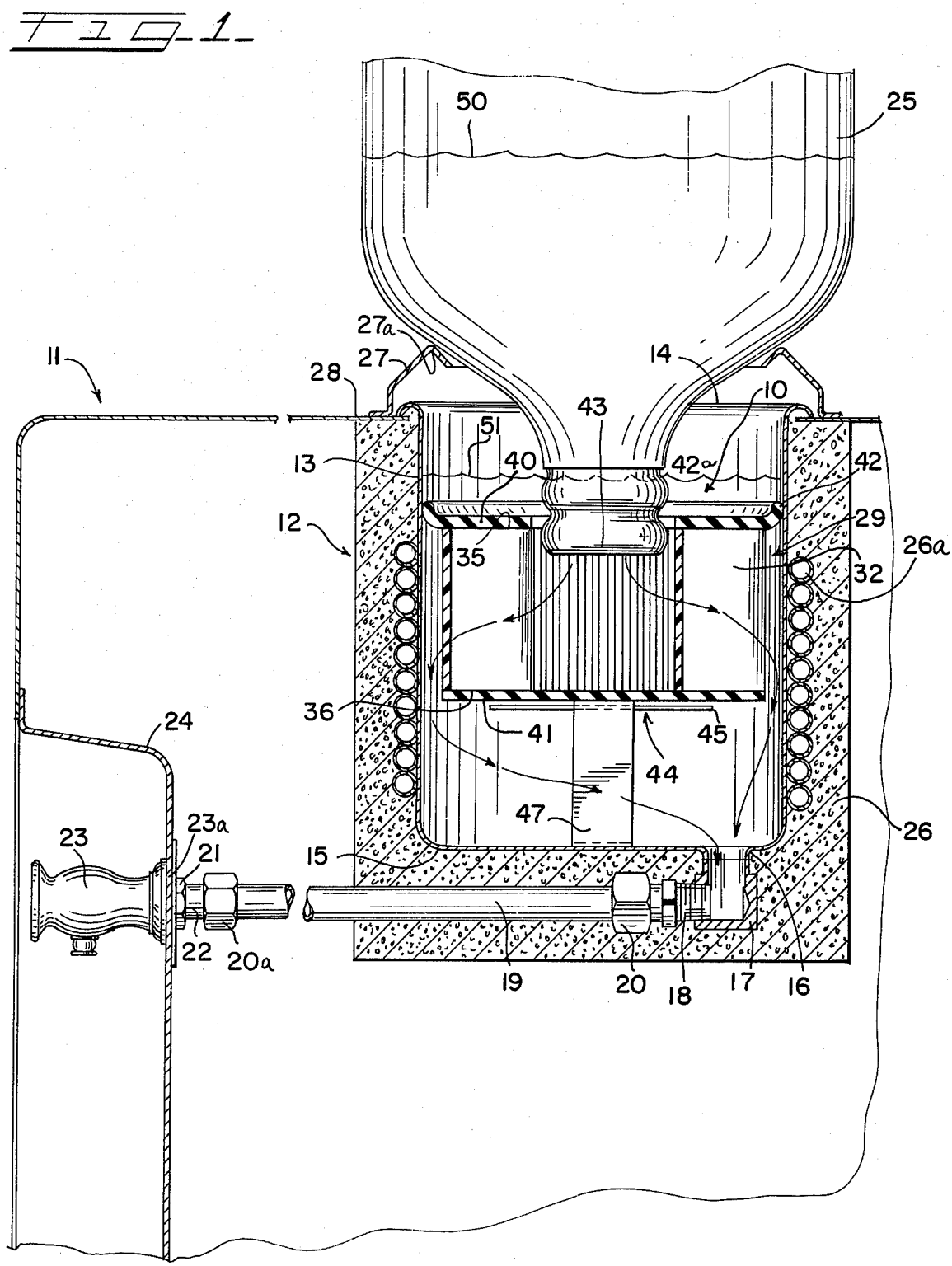
FIG. 1 is a fragmentary vertical sectional view of a refrigerated water cooler, certain parts being shown in elevation, showing a disposable filter cartridge assembly installed in the refrigerated sump of the water cooler in accordance with the present invention.
Figure 2:
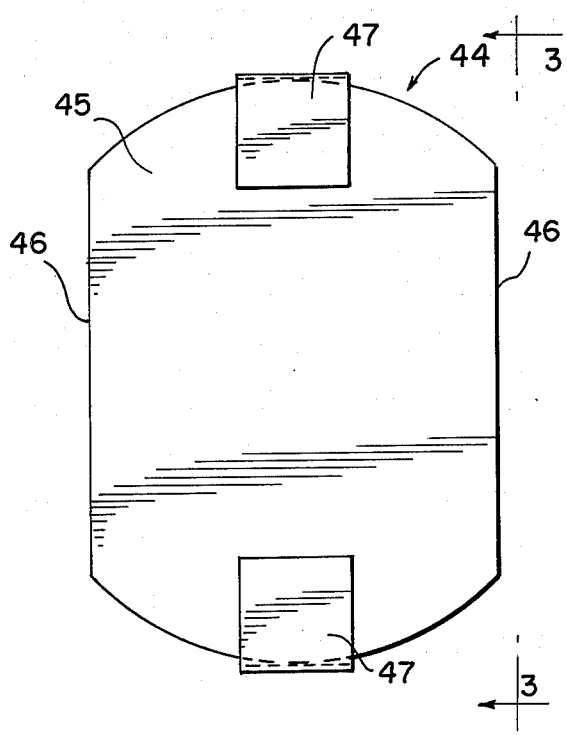
FIG. 2 is a top view of a modified splash shield which supports the filter cartridge horizontally at the proper elevated position above the bottom of the sump in FIG. 1.
Figure 3:
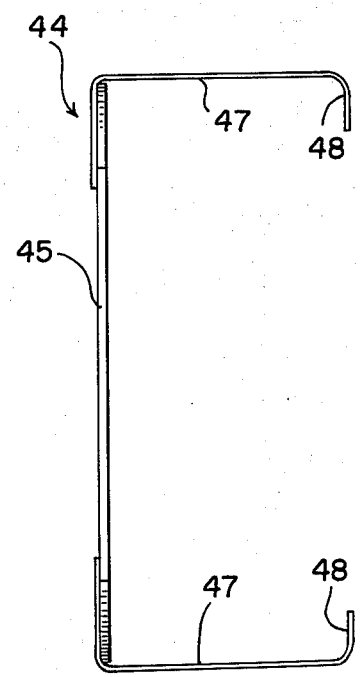
FIG. 3 is a side elevational view of the splash shield taken on line 3—3 of FIG. 2 showing the splash shield supporting legs.

Referring to FIG. 1, a disposable water filter cartridge designated generally by the numeral 10, is installed in the refrigerated sump 12 of cooler 11 of known conventional type. The sump has a cylindrical water-receiving container or liner 13 made of stainless steel or other suitable material with an outwardly extending supporting rim 14 at the top and a bottom surface 15. The bottom 15 is provided with an integral outlet 16 suitably connected to the top opening in an L-shape fitting 17. The L-shaped fitting 17 has a side opening into which is screwed a fitting 18. The outer end of the fitting 18 has the flanged end of a tubing section 19 drawn up against it in known manner by a nut 20 to form a fluid-tight connection. In similar manner the flanged outer end of tubing 19 is connected by a second nut 20a in fluid-tight relationship against the nipple 22 on a spigot 23. Nipple 22 extends through a hole located at a recess in the sidewall 24 of the water cooler. An inner flange surface 23a of the spigot 23 is held flush against the sidewall 24 by a mounting nut 21 screwed on the nipple 22.

Refrigerating coils 26 surround the cylindrical side of the shell 13 and a refrigerant will be circulated therethrough in the usual manner. The container 13, coils 26a, tubing 19 and L-shape fitting 17 are all encased in a shell of insulation 26a. A circular shroud 27 is mounted on the top of the cooler housing 28 so as to encircle the rim 14 of the liner 13. The shroud 27 has a rounded annular rim 27a at the top on which rests the shoulder of inverted water bottle reservoir 25. The rim 27a has one or more interruptions in it so as not to form an air tight seal with shoulder of the bottle, thereby allowing air to be vented as needed into the sump 12 as water is withdrawn from the bottle.

Figure 4:
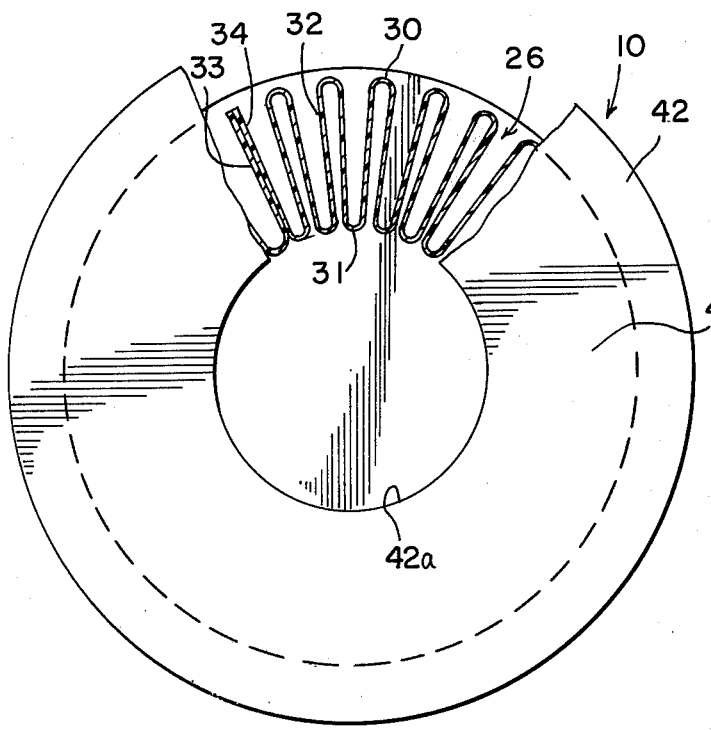
FIG. 4 is a top view of the disposable water filter cartridge of FIG. 1 with a portion of one cover broken away showing the accordian pleats of the filter elements.
Figure 5:
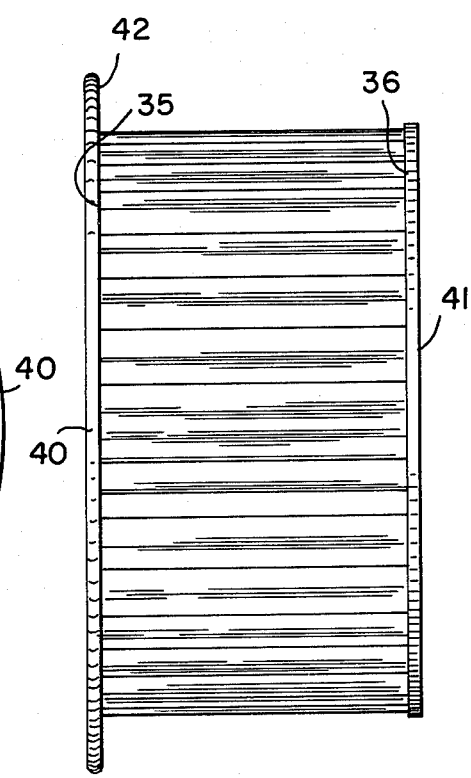
FIG. 5 is a side elevational view of the disposable water filter cartridge of FIG. 1.

It will be seen from FIG. 1 that the water filter cartridge 10 is so positioned in interfitting relationship in the cylindrical water-receiving liner 13 that all water flowing into the sump 12 from the supply bottle 25 and withdrawn through the spigot 23 must pass through an accordian pleated filter element 29. The filter element 29 may be formed from a strip of filter material of known type such as filter paper which is accordian pleated or double-back folded with inner folds 30—30 and outer folds 31—31 as shown in FIG. 4. Folding filter element 29 in this manner provides the element with a large number of substanially identical vertical planar filter segments 32—32. The opposite ends of the strip forming the filter element 29 indicated at 33 and 34 are fastened together by means of water-proof adhesive, of known type. If desired staples or stitches could be used for this purpose. Fastening the ends 33 and 34 in this manner serves to retain the filter element 29 in the shape of an annulus or cylinder with a hollow core. Filter element 29 is closed or sealed off at its top and bottom edges 35 and 36, by top and bottom cover closure disks 40 and 41, respectively, with at least the top disk being made of a pliable or resilient rubber-like moldable material. Cover 40 is annular in shape and has a diameter appreciably greater than the internal diameter of water-receiving sump liner 13. The outer diameter of filter element 29 is less than that of the liner 13 providing a pliable circumferential lip 42 at the outer margin of the cover 40. Both covers or closure disks 40, 41 are sealed in water-tight relation to the upper and lower edges of the filter element 29. These water-tight seals may be obtained by means of waterproof cement or by pressing the filter element edges 35 and 36, respectively, into the covers, 40, 41 when in a thermoplastic or softened condition. The top cover 40 has a central aperture 42a which reveives the bottle mouth 43. When the filter cartridge 10 is installed in the sump 12 as shown in FIG. 1, lip 42 on the filter top closure 40 deforms upwardly against the interior of the water-receiving liner 13 forming a water-tight pressure seal therebetween. Bottom cover or disk 41 completely closes off the bottom of the pleated filter 29 preventing water outflow through the bottom of the filter cartridge 10.

The water filter cartridge 10 is maintained horizontal in spaced relation from the shell bottom surface 15 by means of a support 44 which may also serve as a splash shield in the absence of the filter cartridge 10. The support comprises a generally circular disk 45 which, in this embodiment, has parallel truncated opposing sides 46—46 and supporting legs 47—47 attached thereto which engage the bottom 15 of the liner 13 and thereby maintain the disk 45 is a predetermined spaced relation with the sump bottom surface 15. Legs 47—47 are preferably shorter than the legs on a conventional splash shield. It can be understood that variations in the general shape of the disk may be made without depreciating from the scope of the invention.

The levels of water in the bottle at 50 and in the sump at 51 are determined by a conventional principle, namely, the air pressure in the bottle plus the bottle water head pressure must equal the atmospheric pressure plus the sump head pressure. As water is drawn from the sump 12 and air bubbles into the bottle 25, and water level within the sump remains above the water bottle mouth 43.

In operation, referring to FIG. 1, the water flow is as follows: from bottle 25 into the core 42a of the filter cartridge 10, radially outward through the filter element 29 into the liner 13 below the lip 42, downwardly through the bottom opening 16 into the L-shape fitting 17, through the tubing 19 and discharges through the spigot 23.

It will be appreciated that the filter cartridge 10 should be removed and replaced with a new cartridge at appropriate intervals depending upon usage. Removal is readily accomplished by gripping the cartridge 10 through its center opening 42a and lifting upwardly thereon. In this manner all debris that has collected either on top of or within the cartridge is removed with it. Preferably a new filter cartridge 10 is immediately inserted in the sump 12 to prevent it and the water therein from becoming contaminated with debris of foreign materials.

I claim:

1. In combination in a water cooler: a sump means for temporarily storing and refrigerating water in said cooler, said sump means providing a generally cylindrical side wall in substantially vertical axial orientation in said cooler; a bottom wall across the lower end of said side wall, for enclosing same, an opening acorss the top of said side wall defining an inlet of said sump, an opening in/or adjacent the bottom wall defining an outlet of said sump, a water supply bottle removably disposed above said sump with its outlet located within the inlet of said sump; an improved disposable water filter cartridge removably inserted into said sump through said inlet opening for removing solid substances from flowing through said sump; and means for maintaining said water filter cartridge in vertical spatial relation to said sump bottom wall to provide a reservoir of filtered water at the bottom of said sump; said improved disposable water filter cartridge comprising a filtering media and top and bottom sealing covers which prevent water flow between said supply bottle and said outlet in said sump means without passing through said filtering media, said filtering media being in sheet form folded in double back pleats at intervals along its length and formed define an annular structure of smaller outside diameter than the inner diameter of said sump means and having substantially radially extending surfaces surrounding a hollow core, said bottom cover being a circular disc having an outer diameter smaller than the inner diameter of said sump means and a top surface sealingly engaging the bottom edges of said media, said top cover being a circular disc having a diameter larger than the inner diameter of said sump means, a bottom surface which sealingly engages the top edges of said filtering media, an elastic peripheral lip capable of forming a seal by deforming and exerting pressure on the wall of said sump in which the cartridge is inserted, and a central circular opening through said top cover adjacent and of smaller diameter than that of said core.

2. In combination in a water cooler of the type having a bowl shape housing forming a refrigerated sump including an inlet opening at the top and an outlet opening at the bottom thereof for receiving water from an inverted bottle supported at the inlet of said bowl shape housing, removable water filter cartridge and a support therefor, said support comprising a disc made of rigid material having a major diagonal dimension smaller than the diameter of said bowl shape housing, and leg supports attached to said disc for maintaining a spaced relationship between said disc and a bottom surface of said bowl shape housing, and said water filter cartridge comprising a filtering element being an elongated sheet of filtering material folded in continuous accordian pleats at regular intervals defining an annular structure with a plurality of sides extending generally radially from an inner circle, and an outer diameter smaller than the diameter of said bowl shape housing, a bottom cover having an outer diameter smaller than the diameter of said bowl shape housing and secured in water-tight relationship with the bottom edges of said filter element, and a top cover secured in water-tight relationship with the top edges of said filter element having an outer diameter larger than that of said bowl shape housing, a peripheral lip made of elastic material for forming a continuous mechanical seal with an annular contiguous portion of said bowl shape housing mediate the top and bottom thereof, and a central aperture adjacent to and smaller than said filter element inner circle.

3. In combination in a water cooler of the type having a bowl shape housing forming a refrigerated sump including an inlet opening at the top and an outlet opening at the bottom thereof for receiving water from an inverted bottle supported adjacent said inlet of said bowl shape housing, a removable water filter cartridge comprising a filtering element being an elongated sheet of filtering material folded in continuous accordian pleats at regular intervals defining an annular structure with a plurality of sides extending generally radially from an inner circle, and an outer diameter smaller than the diameter of said bowl shape housing, a bottom cover being secured in water-tight relationship with the bottom edges of said filter element and having a diameter corresponding to that of said annular filter element, and a top cover secured in water-tight relationship with the top edges of said filter element having an outer diameter larger than the inner diameter of said bowl shape housing, a peripheral lip made of elastic material capable of forming a continuous mechanical seal with said bowl shape housing, and a central aperture adjacent to and smaller than said filter element inner circle, and said support comprising a generally circular disc made of rigid material having a major diagonal dimension smaller than the diameter of a liner in said sump, and having truncated portions bordered by a pair of parallel chords located equally distant from the center of said disc, and leg supports attached to said disc for maintaining a spaced relation between said disc and a bottom surface of said sump, said leg supports including a pair of elongated strips of relatively rigid material having perpendicular inwardly turned end portions, one end portion of each strip being attached to the center periphery of each non-truncated portion of said disc, a second end portion on said sump bottom surface, and the length of said leg supports being predetermined to support said filter cartridge in a spatial relationship with the bottom of said bowl shape housing whereby a neck of said water bottle as installed protrudes partially through said top cover central aperture.

* * * * *

UNITED STATES PATENT AND TRADEMARK OFFICE
CERTIFICATE OF CORRECTION

PATENT NO. : 3,923,662
DATED : Dec. 2, 1975
INVENTOR(S) : RAYMOND A. O'BRIEN

It is certified that error appears in the above-identified patent and that said Letters Patent are hereby corrected as shown below:

Column 1, line 39, change "suitable" to --suitably--. Column 2, line 17, change "cump" to --sump--; column 2, line 18 change "theough" to --through--; column 2, line 54, before "cooler" insert --water--; column 4, line 1, change "is" to --in--; column 4, line 39, change "acorss" to --across--; column 4, line 43, after "outlet" insert --end--; column 4, line 46, after "from" insert --water--.

Signed and Sealed this

Thirtieth Day of November 1976

[SEAL]

Attest:

RUTH C. MASON
*Attesting Officer*

C. MARSHALL DANN
*Commissioner of Patents and Trademarks*